(12) United States Patent
Monchiero et al.

(10) Patent No.: US 9,608,922 B2
(45) Date of Patent: Mar. 28, 2017

(54) TRAFFIC CONTROL ON AN ON-CHIP NETWORK

(75) Inventors: Matteo Monchiero, San Francisco, CA (US); Javier Carretero Casado, Barcelona (ES); Enric Herrero Abellanas, Cardedeu (ES); Tanausu Ramirez, Barcelona (ES); Xavier Vera, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 13/993,575

(22) PCT Filed: Dec. 23, 2011

(86) PCT No.: PCT/US2011/067264
§ 371 (c)(1),
(2), (4) Date: Jun. 12, 2013

(87) PCT Pub. No.: WO2013/095664
PCT Pub. Date: Jun. 27, 2013

(65) Prior Publication Data
US 2014/0010079 A1  Jan. 9, 2014

(51) Int. Cl.
*H04L 12/24* (2006.01)
*H04L 12/825* (2013.01)
*G06F 15/78* (2006.01)

(52) U.S. Cl.
CPC .......... *H04L 47/25* (2013.01); *G06F 15/7825* (2013.01); *H04L 47/263* (2013.01); *Y02B 60/1207* (2013.01); *Y02B 60/1225* (2013.01); *Y02B 60/31* (2013.01)

(58) Field of Classification Search
None
See application file for complete search history.

(56) References Cited

U.S. PATENT DOCUMENTS

| 7,512,066 B2 | 3/2009 | Santos et al. | |
| 7,839,777 B2 * | 11/2010 | DeCusatis et al. | 370/230 |
| 8,000,242 B2 * | 8/2011 | Wang et al. | 370/235 |

(Continued)

FOREIGN PATENT DOCUMENTS

TW  200637270 A1  10/2006

OTHER PUBLICATIONS

PCT International Search Report for PCT Counterpart Application No. PCT/US2011/067264, 3 pgs., (Sep. 25, 2012).

(Continued)

*Primary Examiner* — Alex Skripnikov
(74) *Attorney, Agent, or Firm* — Nicholson De Vos Webster & Elliot LLP

(57) ABSTRACT

An apparatus, system, and method for controlling traffic on an on-chip network. Embodiments of the method comprise injecting a packet at a first rate into the on-chip network by a first node coupled to the on-chip network, receiving the packet at a second node coupled to the on-chip network, modifying a bit in the packet by the second node in response to determining that a rate at which packets are injected into the on-chip network should change, returning the packet with the bit modified to the first node by the second node, and changing the first rate by the first node in response to detecting that the bit in the packet was modified.

11 Claims, 9 Drawing Sheets

(56) References Cited

U.S. PATENT DOCUMENTS

| | | |
|---|---|---|
| 2005/0078603 A1 | 4/2005 | Turner et al. |
| 2008/0084864 A1* | 4/2008 | Archer et al. ............... 370/351 |
| 2008/0313353 A1* | 12/2008 | Roediger et al. ............ 709/246 |
| 2009/0252171 A1* | 10/2009 | Kumar et al. ............... 370/397 |

OTHER PUBLICATIONS

PCT Written Opinion of the International Searching Authority for PCT Counterpart Application No. PCT/US2011/067264, 4 pgs., (Sep. 25, 2012).

PCT Notification concerning Transmittal of International Preliminary Report on Patentability (Chapter I of the Patent Cooperation Treaty) for PCT Counterpart Application No. PCT/US2011/067264, 6 pgs., (Jul. 3, 2014).

Joan-Lluis Ferrer et al. "On the Influence of the Packet Marking and Injection Control Schemes in Congestion Management for MINs", Proceedings of the 14th International Euro-Par conference on Parallel Processing, 2008, 10 pgs.

Office action and Search Report from Taiwan Patent Application No. 101145909, mailed Mar. 13, 2015, 10 pages.

Office action and Search Report with English translation of Search Report from Taiwan Patent Application No. 101145909, mailed Nov. 26, 2015, 9 pages.

* cited by examiner

TRAFFIC CONTROL ON AN ON-CHIP NETWORK

CROSS-REFERENCE TO RELATED APPLICATION

This patent application is a U.S. National Phase Application under 35 U.S.C. §371 of International Application No. PCT/US2011/067264, filed Dec. 23, 2011, entitled TRAFFIC CONTROL ON AN ON-CHIP NETWORK.

FIELD

Embodiments of the invention relate generally to traffic on on-chip networks, and more particularly to controlling traffic on on-chip networks.

BACKGROUND

Components on a computer chip may be organized as an on-chip network of nodes. For example, a multicore processor may be organized as an on-chip network of cores. High traffic on on-chip networks (e.g., due to traffic bursts) can result in performance decreases, increased power consumption, and decreased quality of service.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" appearing herein describe various embodiments and implementations of the invention, and do not necessarily all refer to the same embodiment. However, they are also not necessarily mutually exclusive.

Figure 1:
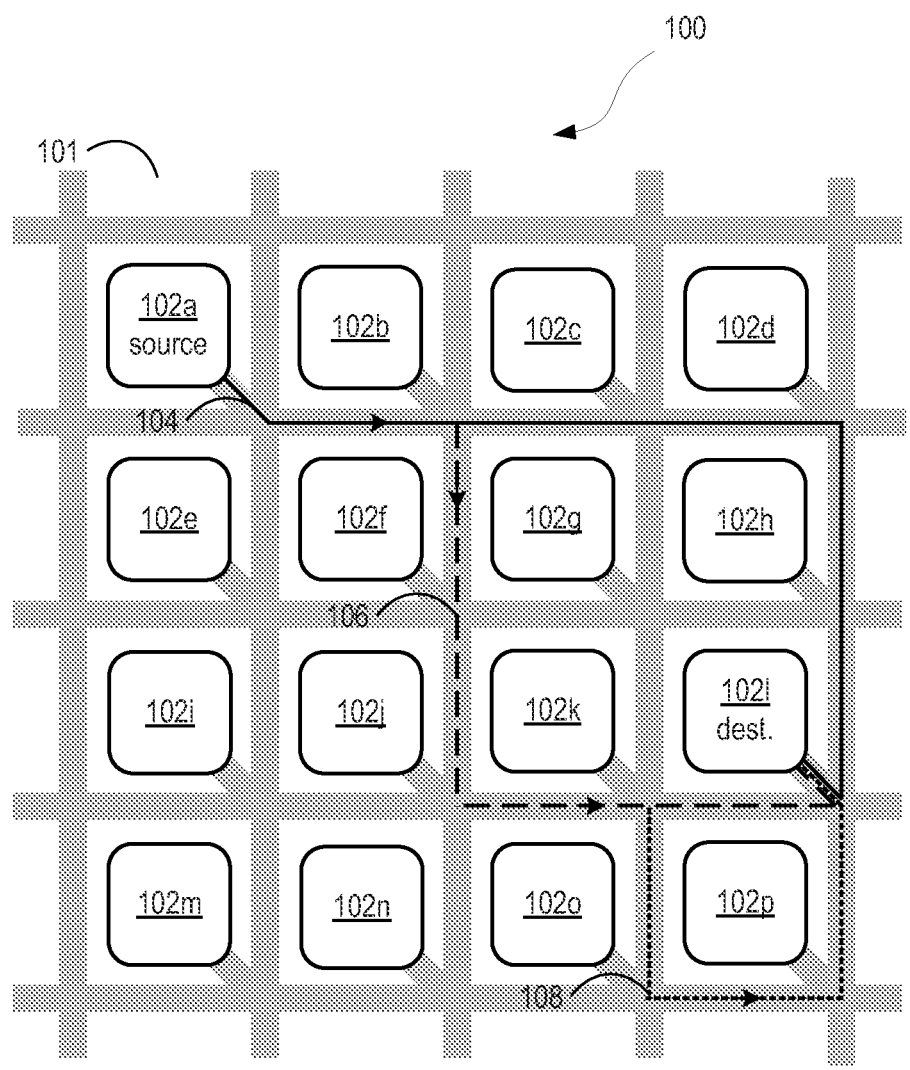
FIG. 1 is a block diagram showing an on-chip network that implements deflection by rerouting deflected packets to their destination, and an exemplary route taken by a packet on the network.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention provide a method, apparatus, and system for controlling traffic on an on-chip network (e.g., a multicore processor with cores organized as an on-chip network). Traffic on an on-chip network could comprise, for example, packets (e.g., transaction packets) being sent from source nodes to destination nodes, some of which are routed via intermediate nodes coupled to the on-chip network.

According to one embodiment, traffic on the on-chip network can be controlled or influenced by using extra bits in the packet format and routing algorithms to be executed on nodes coupled to the network. In one embodiment, the extra bits and routing algorithms enable packets to be deflected back to their source nodes carrying information regarding changing a packet-injection rate. In one such embodiment, this information exchange via deflected packets between nodes coupled to a network provides for a mechanism for controlling traffic on on-chip networks.

On-chip networks may be implemented in a variety of ways, including, for example, router-based mesh networks. A router-based mesh network is a network of nodes in which interconnected nodes relay packets to their destinations. In a router-based mesh network, each node and each packet sent from one node to another node on the on-chip network (i.e., from a source node to a destination node) have unique identifying information. To assist in relaying packets, buffering may be provided at both the destination nodes and/or at the intermediate nodes to store packets along their way to the destination nodes. Some buffered network implementations may employ credits to notify sender-nodes when buffer space on intermediate and/or destination nodes becomes available.

Although buffered, router-based mesh networks can have the benefit of scalability, there can be drawbacks. For example, on-chip mesh networks having buffering resources can require significant chip area and power. One way to minimize buffering resources (and therefore require less chip area and reduce power consumption) is to implement a network with deflection routing. Networks using deflection routing allow the "bouncing" (i.e., deflection) of packets that are rejected at destination nodes and/or at intermediate nodes. Packets may be rejected due to a variety of reasons including, for example, insufficient resources at a node for handling incoming packets. Typically, packets that are deflected may be rerouted to use different channels to reach their destinations. Deflection routing can permit a reduction in buffer sizes, but can result in increased traffic on the on-chip network as some packets will be deflected rather than buffered.

Embodiments of the invention include a mechanism to reduce bouncing traffic in a generic buffered router-based mesh network that employs deflection at the endpoints and/or at the intermediate routers. In one embodiment, one or more bits are included in the packet format that enable deflecting nodes to indicate that a packet-injection rate should change (e.g., a "throttle down" bit), and deflected packets are returned to their source nodes. According to one embodiment, a source node, in response to detecting the bit set in a returned packet, adjusts its packet-injection rate.

FIG. 1 is a block diagram 100 showing an on-chip network that implements deflection by rerouting deflected packets to their destination, and an exemplary route taken by a packet on the network. On-chip mesh network 101 includes interconnected nodes 102a-102p. In this example, source node 102a injects a packet into the on-chip mesh network 101 to which it is coupled; the packet's final target is destination node 102l, which is also coupled to the on-chip network 101.

Initially, the packet was to travel down an initial route 104 (represented by the solid line) from the source node 102a to the destination node 102l. However, in this example, the packet is deflected by an intermediate node (e.g., node 102c). Once the packet is deflected, deflection routing may involve modifying the routing algorithms of intermediate routers so that a packet that cannot be routed on an initial route (e.g., route 104) is routed on an alternative route (e.g., route 106, which is represented by the dashed line). In this example, the packet is deflected a second time by destination node 102l. After being deflected at the destination node 102l, the packet can take a route such as route 108 (represented by the dotted line) back to the destination node.

Figure 2:
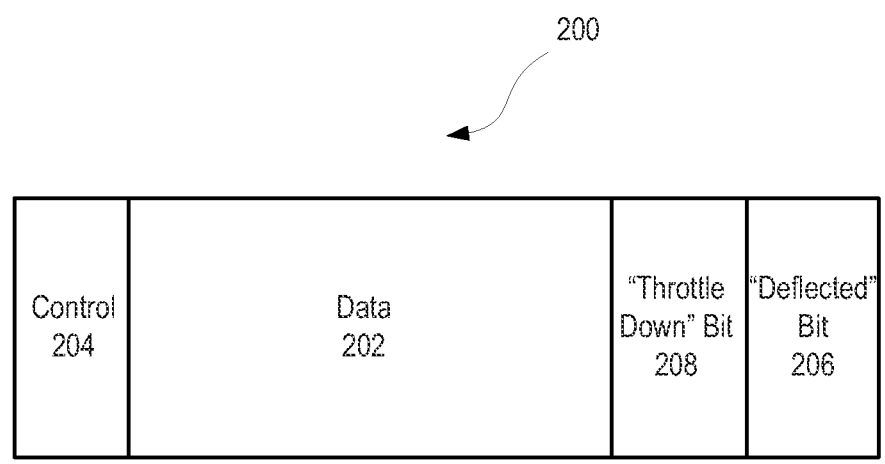
FIG. 2 is a block diagram of a packet with a "deflected" bit and a "throttle down" bit for use with routing algorithms to control traffic on an on-chip network according to one embodiment.

FIG. 2 is a block diagram of one embodiment of a packet with additional bits for use with routing algorithms to control traffic on an on-chip network. In one embodiment, the packet 200 includes data 202, control information 204, a "deflected" bit 206, and a "throttle down" bit 208. The control information 204 may include, for example, information identifying the packet 200, the packet's source node, and the packet's destination node. In one embodiment, the control information 204 further includes information identifying the route the packet has taken from its source node.

In one embodiment, the "deflected" bit 206 is modified by a deflecting node (e.g., node 102c or node 102l in FIG. 1) to indicate that the packet 200 was deflected. In one embodiment, the "throttle down" bit 208, is set by a deflecting node if the deflecting node determines that injected traffic should be reduced. According to one embodiment, after being deflected by an intermediate or destination node, instead of being rerouted to its destination node, the packet 200 is returned to its source node (e.g., node 102a in FIG. 1). Once the packet arrives at its source node, the source node changes its packet-injection rate according to the "throttle down" bit 208. For example, the source node can delay resending the packet 200 to the destination node if the "throttle down" bit 208 is set.

Figure 3:
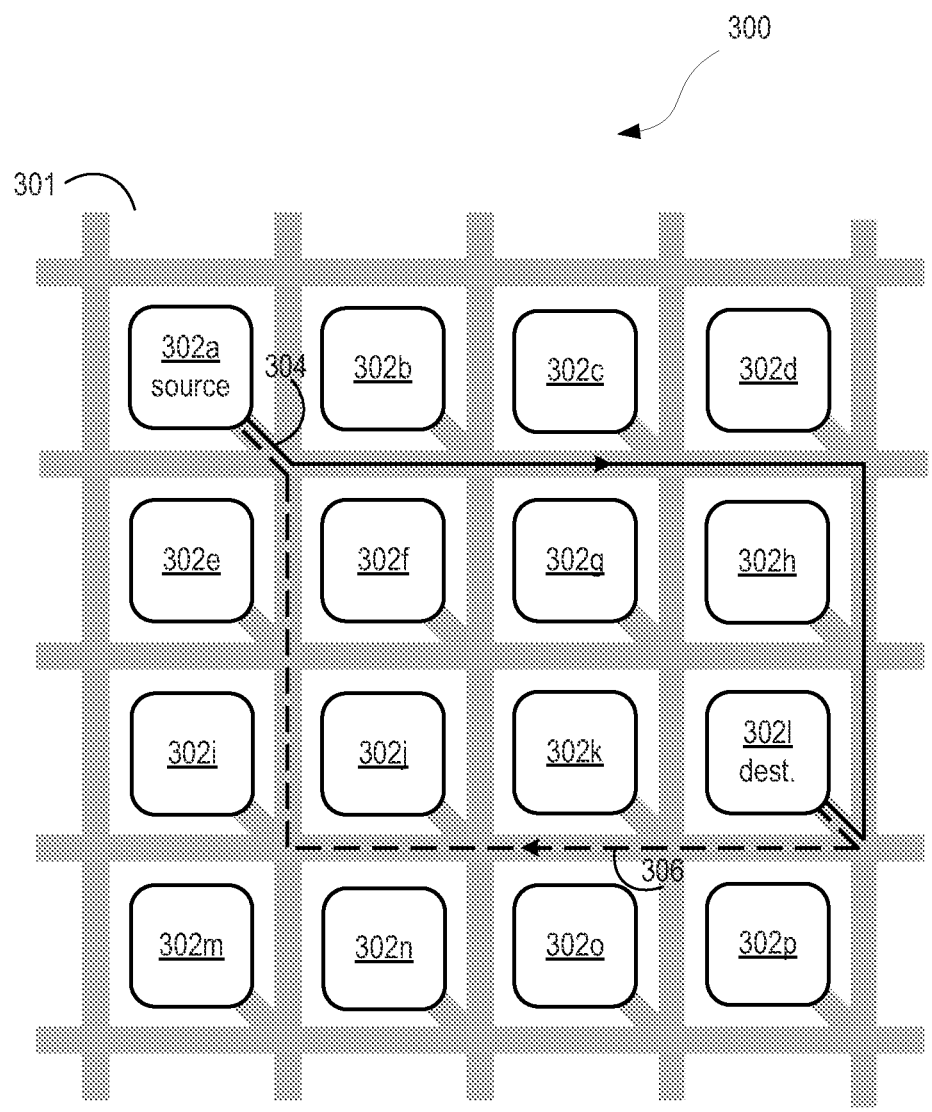
FIG. 3 is a block diagram of an on-chip network showing an exemplary route taken by a deflected packet that is returned to the source node by the destination node according to one embodiment.

FIG. 3 is a block diagram 300 of an embodiment of an on-chip network showing an exemplary route taken by a deflected packet that is returned to the source node by the destination node. According to one embodiment, nodes 302a-302p transmit packets having a format that includes a "throttle down" bit and a "deflected" bit (e.g., the packet 200 in FIG. 2). In one embodiment, returning a deflected node to its source node with one or more bits modified to relay information can help control traffic on the on-chip network.

For example, in one embodiment, a source node 302a injects a packet into the network 301 and the packet is routed to its destination node 302l via intermediate nodes 302b, 302c, 302d, and 302h (shown by route 304 and represented by a solid line). At destination node 302l, the destination node 302l determines whether to deflect the packet. As mentioned above, packets may be deflected for a number of reasons, including the destination node 302l having insufficient space available in its buffer.

In addition to deciding whether to deflect the packet, in one embodiment the destination node 302l determines whether a packet-injection rate on the on-chip network should change. For example, in one embodiment the destination node determines whether the rate at which the source node 302a injects packets should be decreased (i.e., throttled down). The determination of whether a packet-injection rate should change can be based on a number of factors. In one embodiment an algorithm based on the monitoring of micro-architectural events and/or resource usage can be used to determine if the destination node is busy and requires this action. For example, counters (e.g., anti-starvation counters) can be used to signal when the number of rejected packets has exceeded a threshold. In another embodiment the determination of whether to change a packet-injection rate is based on the fill level of some resources in the node (e.g., a buffer).

Once the destination node 302l determines whether a packet-injection rate should be changed, the destination node 302l can modify one or more bits in the packet to communicate the desired packet-injection rate change. For example, in one embodiment, the destination node 302l can set a "throttle down" bit in the packet returned to the source node 302a. In one embodiment, the destination node 302l can modify one or more additional bits to communicate whether the packet was deflected (e.g., a "deflected" bit). In one such embodiment, the "deflected" bit can communicate additional information to its source node and/or other nodes. For example, using a "deflected" bit in addition to a "throttle down" bit provides information about situations in which a packet is deflected but where it is determined that no throttling down is needed (and therefore the deflecting node does not set a "throttle down" bit).

In the example in FIG. 3, the destination node 302l deflects the packet. In one embodiment, instead of the deflected packet being routed back to the destination node 302l (like the deflected packet referred to with respect to FIG. 1), the packet is returned to its source node 302a. The deflected packet's route back to its source node 302a is shown by route 306 (represented by a dashed line).

In one embodiment, once the source node 302a receives the deflected packet, the source node 302a adjusts its packet injection rate according to the information in the deflected packet (e.g., the "throttle down" bit) and resends the packet to the destination node 302l. Adjusting the source node's packet injection rate may include, for example, waiting for a number of cycles before resending the packet.

According to one embodiment, by creating this communication loop between the source node 302a and the destination node 302l, it is possible for the destination node 302l to attach extra information to the returning packet (e.g., a request to throttle down the sender's packet injection rate), and reduce high rates of deflection on the on-chip network.

Figure 4:
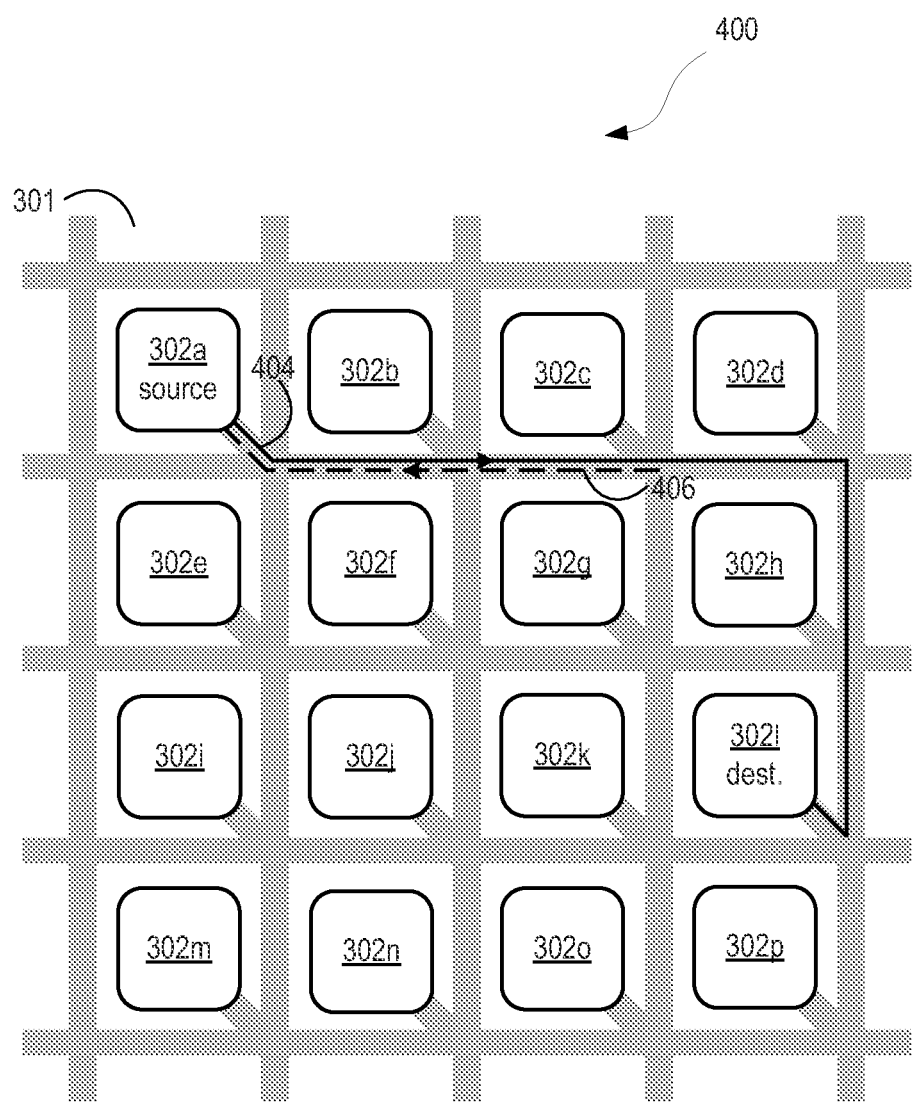
FIG. 4 is a block diagram of an on-chip network showing an exemplary route taken by a deflected packet that is returned to the source node by an intermediate node according to one embodiment.

FIG. 4 is a block diagram of an embodiment of an on-chip network showing an exemplary route taken by a deflected packet that is returned to the source node by an intermediate node.

Similar to the embodiment illustrated in FIG. 3, a source node 302a injects a packet into the network 301 targeting destination node 302l (as demonstrated by route 404, represented by a solid line to the destination node 302l). However, in this embodiment an intermediate node 302c deflects the packet back to source node 302a (demonstrated by route 406, represented by a dashed line).

In one such embodiment, the intermediate deflecting node determines whether to deflect the packet and whether a packet injection rate (e.g., the source node's packet injection rate) should change. Similarly to the determinations by the destination node 302l described in reference to FIG. 3, an intermediate node 302c can modify one or more bits in the packet (e.g., to indicate that the source node 302a should be "throttled down") and send the packet back to the source node 302a using the same algorithm(s). In one embodiment employing deflection at intermediate nodes, the implementation includes mechanisms for avoiding "nested bouncing." For example, such mechanisms could include logic to ensure that when a destination node has deflected a packet, the packet is not deflected again at an intermediate node. One way to accomplish this is through the use of a "deflected bit" in the packet, as described above with reference to FIG. 2.

The on-chip networks illustrated in FIGS. 1, 3, and 4 are exemplary and are not intended to be limiting. Embodiments of the invention are applicable for other configurations of on-chip networks.

Figure 5:
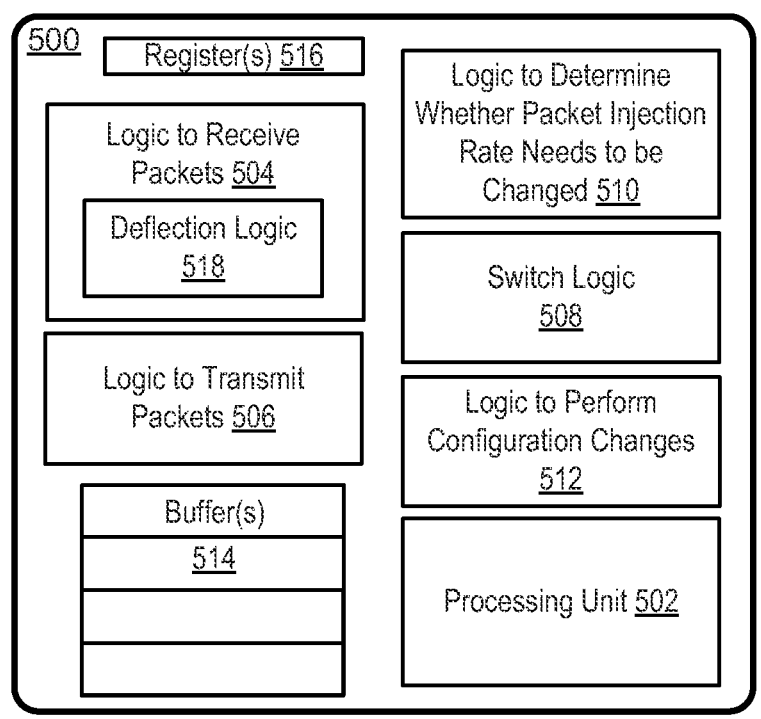
FIG. 5 is a block diagram of a node coupled to an on-chip network according to one embodiment.

FIG. 5 is a block diagram of an embodiment of a node on an on-chip network. In one embodiment, node 500 is a core of a multicore processor and includes processing unit 502 for executing instructions. In one embodiment, node 500 further includes logic 504 to receive packets, logic 506 to transmit packets (i.e., inject packets into the network), switch logic 508 for determining a received packet's destination, logic 510 to determine whether a packet-injection rate should be changed, logic 512 to perform configuration changes, buffer(s) 514 for holding packets, and register(s) 516. Register(s) 516 may include information uniquely identifying node 500, and/or control information such as the node's packet-injection rate.

According to one embodiment, logic 504 to receive packets may include logic 518 to determine if a received packet should be deflected, and switch logic 508 includes logic to determine a route of a packet to be deflected. In one embodiment, switch logic 508 determines a deflected packet's route according to a specific policy. For example, a deflected packet can be sent via a pre-defined route (e.g., the same path by which it came to the deflecting node) or through a different path using a different routing algorithm (e.g., by using global considerations such as congestion). According to one embodiment, a deflected packet's route is chosen according to a policy such as round-robin or randomly. A round-robin policy may comprise choosing the next channel according to an order (every time a channel is to be chosen, the next channel in order is selected). In case of deflecting at a destination node, in one embodiment an algorithm to select the deflected packet's route selects a route to avoid congestion around the destination node (e.g., to avoid tight loops around the destination node).

Before transmitting a packet that is to be deflected, logic 510 determines whether a packet-injection rate should change. For example, according to one embodiment, logic 510 determines whether the deflected packet's source node's packet-injection rate should be throttled down. If logic 510 determines that a packet-injection rate should change, one or more bits in the packet are modified to communicate that decision to another node (e.g., the source node).

Figure 6:
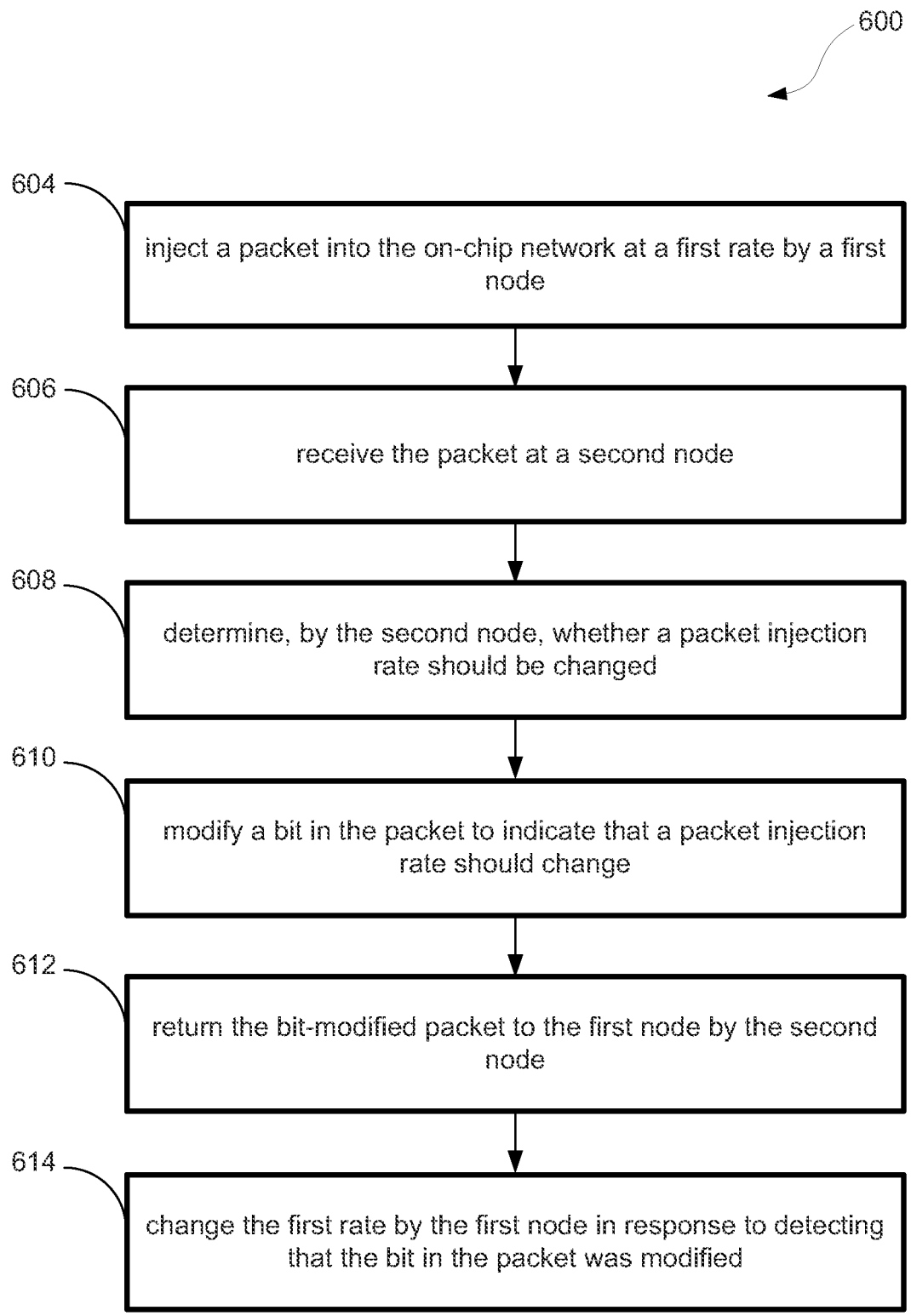
FIG. 6 is a flow diagram of a process for controlling traffic on an on-chip network according to one embodiment.

FIG. 6 is a flow diagram 600 of an embodiment of a process for controlling traffic on an on-chip network. According to one embodiment, at block 604, a packet is injected into the on-chip network at a first rate by a first node. In the case where the packet originates at the first node, the first node is the packet's source node. At block 606, the packet is received by a second node, which could be the packet's destination node or an intermediate node. At block 608, the second node determines whether a packet-injection rate should be changed (e.g., determining whether the packet's source node should be throttled down). In one embodiment, the determination of whether a packet-injection rate should be changed only occurs after the node determines that the packet will be deflected.

At block 610, the second node modifies a bit in the packet to indicate that a packet-injection rate should change. For example, the second node can set a bit in the packet to indicate that the second node is busy and that traffic should be throttled down.

At block 612, the second node returns the packet to its source node (i.e., the first node). The packet may be returned using a path determined according to a specific policy (e.g., the path the packet took from the first node to the second node, or a random path back to the first node).

At block 614, the first node changes the first rate (e.g., the first node's packet-injection rate) in response to detecting that the bit in the packet was modified. For example, the source node can decrease its packet-injection rate, and/or delay resending the deflected packet to its destination. In one embodiment, the method describe in flow diagram 600 provides a means by which traffic on the on-chip network is controlled by changing the first node's packet-injection rate.

Figure 7:
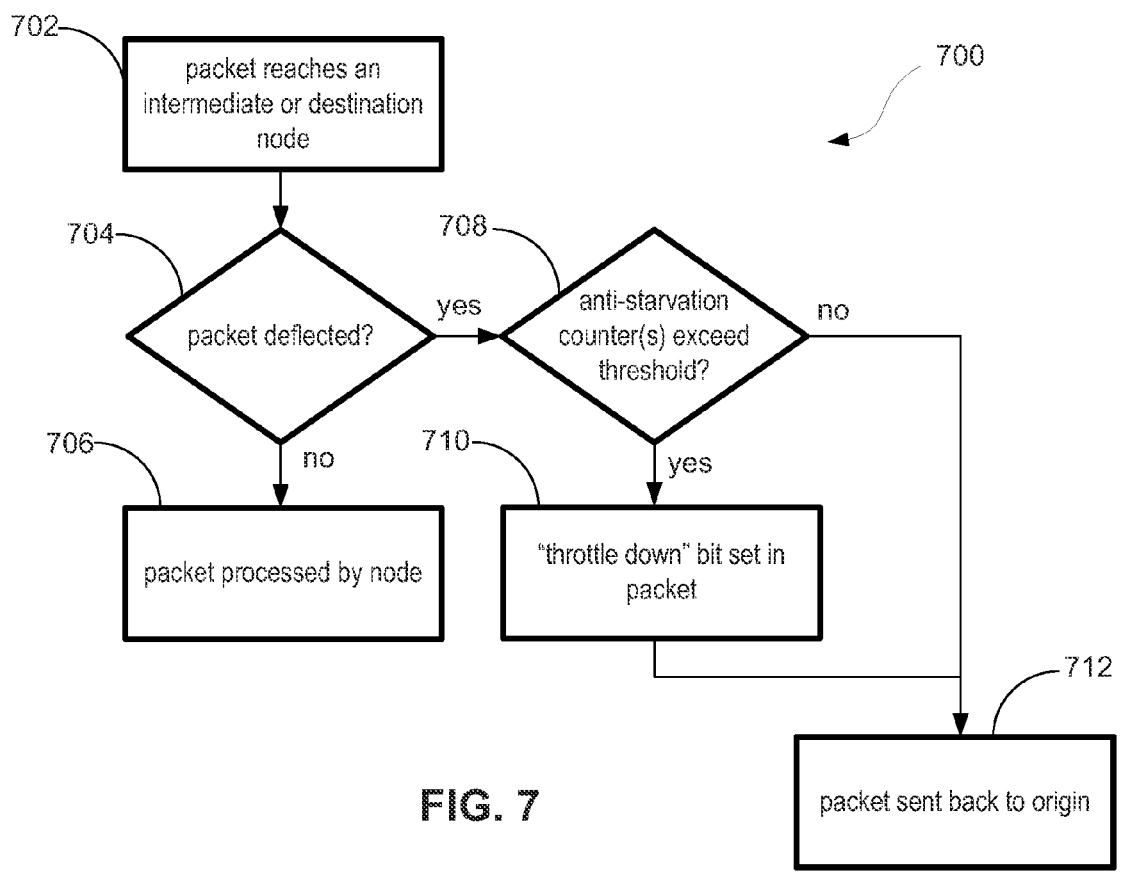
FIG. 7 is a flow diagram of a process for handling a packet at an intermediate or a destination node according to one embodiment.

FIG. 7 is a flow diagram of an embodiment of a process for handling a packet at an intermediate or destination node. Flow diagram 700 begins at block 702, where a packet reaches an intermediate or destination node. At decision block 704, the node determines whether to deflect the packet. If the packet is not deflected, the packet is processed by the node at block 706. Processing the packet may include, for example, determining that the packet's destination is another node and forwarding the packet to that node, or determining that the packet's destination has been reached. If the packet's destination has been reached, the node may then execute instructions according to the packet's contents.

If the packet is to be deflected, the node also determines whether a packet-injection rate should be changed. For example, in one embodiment the node determines whether anti-starvation counter(s) exceed a predetermined threshold at decision block 708. If the anti-starvation counter(s) exceed the predetermined threshold, a "throttle down" bit in the packet is set at block 710, and the packet is sent back to its source node at block 712. According to one embodiment, if the counter(s) do not exceed the threshold, the packet is sent back to its origin without setting the "throttle down" bit in the packet at block 712.

Figure 8:
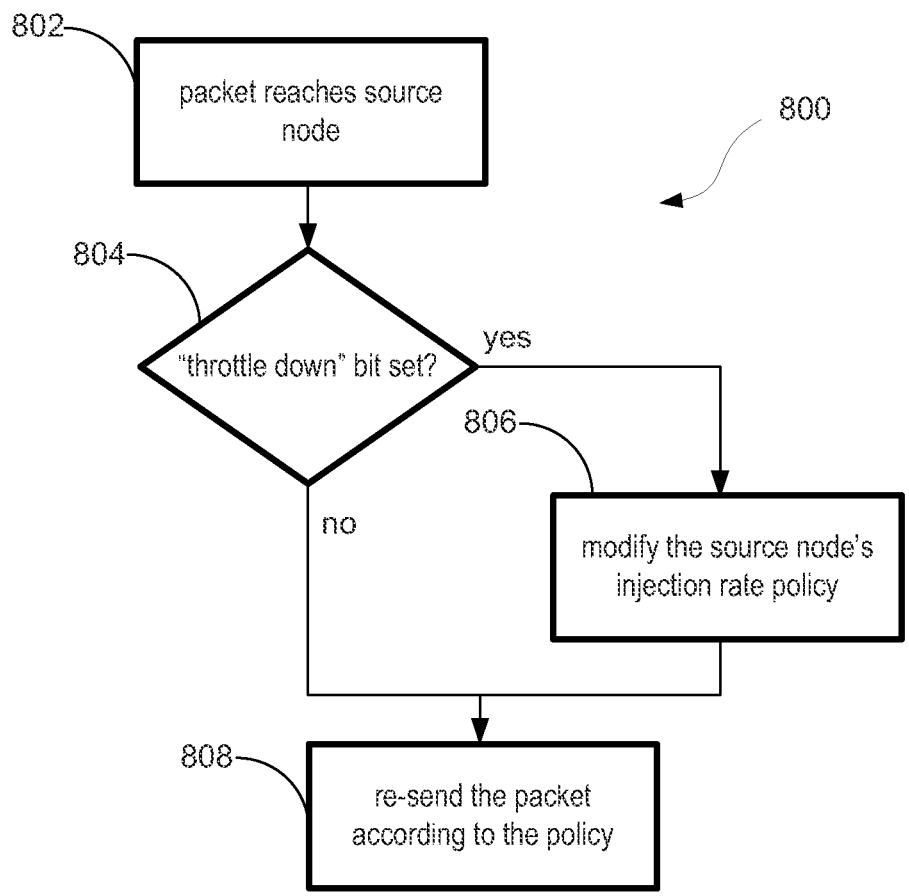
FIG. 8 is a flow diagram of a process for handling a packet that was returned to its source node according to one embodiment.

FIG. 8 is a flow diagram of an embodiment of a process for handling a packet that was returned to its source node (e.g., as in block 712 of FIG. 7). Flow diagram 900 begins at block 802 where a packet reaches its source node (i.e., the node at which the packet originated). At decision block 804, the source node checks if a "throttle down" bit in the packet is set. If the "throttle down" bit is not set, the source node resends the packet to its destination according to its policy at block 808. If the "throttle down" bit is set, the source node modifies its packet-injection rate policy at block 806 and then resends the packet according to the policy at block 808. Different packet-injection rate policies may be used to determine when to resend the packet. For example, the packet can be re-sent immediately or after some time delay.

Figure 9:
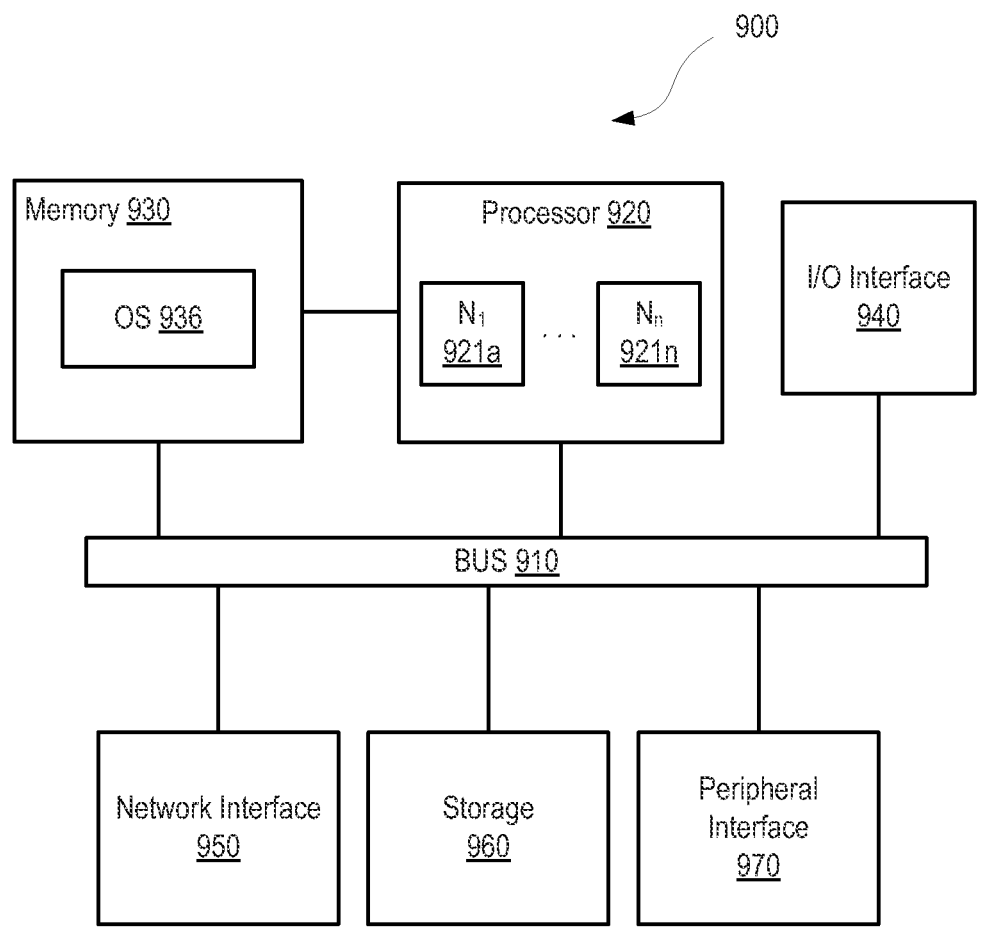
FIG. 9 is a block diagram of a computing system with a multicore processor with cores organized as an on-chip network in which embodiments of the invention may operate, be executed, integrated, and/or configured.

FIG. 9 is a block diagram of an embodiment of a computing system with a multicore processor with cores organized as an on-chip network in which embodiments of the invention may operate, be executed, integrated, and/or configured. System 900 represents a computing device, and can be a laptop computer, a desktop computer, a server, a gaming or entertainment control system, a scanner, copier, printer, a tablet, or other electronic device. System 900 includes processor 920, which provides processing, operation management, and execution of instructions for system 900. Processor 920 can include any type of processing hardware having multiple processor cores 921a-921n to provide processing for system 900. Processor cores 921a-921n are organized as an interconnected on-chip network (e.g., as an on-chip router-based mesh network). Processor cores 921a-921n include logic to enable deflection and routing of packets back to the packet's source node to reduce bouncing traffic (i.e., traffic resulting from deflections). Embodiments of the invention as described above may be implemented in system 900 via hardware, firmware, and/or software.

Memory 930 represents the main memory of system 900, and provides temporary storage for code to be executed by processor 920, or data values to be used in executing a routine. Memory 930 may include one or more memory devices such as read-only memory (ROM), flash memory, one or more varieties of random access memory (RAM), or other memory devices, or a combination of such devices. Memory 930 stores and hosts, among other things, operating system (OS) 936 to provide a software platform for execution of instructions in system 900. OS 936 is executed by processor 920.

Processor 920 and memory 930 are coupled to bus/bus system 910. Bus 910 is an abstraction that represents any one or more separate physical buses, communication lines/interfaces, and/or point-to-point connections, connected by appropriate bridges, adapters, and/or controllers. Therefore, bus 910 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 910 can also correspond to interfaces in network interface 950.

In one embodiment, bus 910 includes a data bus that is a data bus over which processor 930 can read values from memory 930. The additional line shown linking processor 920 to memory subsystem 930 represents a command bus over which processor 920 provides commands and addresses to access memory 930.

System 900 also includes one or more input/output (I/O) interface(s) 940, network interface 950, one or more internal mass storage device(s) 960, and peripheral interface 970 coupled to bus 910. I/O interface 940 can include one or more interface components through which a user interacts with system 900 (e.g., video, audio, and/or alphanumeric interfacing). Network interface 950 provides system 900 the ability to communicate with remote devices (e.g., servers, other computing devices) over one or more networks. Network interface 950 can include an Ethernet adapter, wireless interconnection components, USB (universal serial bus), or other wired or wireless standards-based or proprietary interfaces.

Storage 960 can be or include any conventional medium for storing data in a nonvolatile manner, such as one or more magnetic, solid state, or optical based disks, or a combination. Storage 960 may hold code or instructions and data in a persistent state (i.e., the value is retained despite interruption of power to system 900). Storage 960 may include a non-transitory machine-readable or computer readable storage medium on which is stored instructions (e.g., software and/or firmware) embodying any one or more of the methodologies or functions described herein.

Peripheral interface 970 can include any hardware interface not specifically mentioned above. Peripherals refer generally to devices that connect dependently to system 900. A dependent connection is one where system 900 provides the software and/or hardware platform on which operation executes, and with which a user interacts. Besides what is described herein, various modifications can be made to the disclosed embodiments and implementations of the invention without departing from their scope. Therefore, the illustrations and examples herein should be construed in an illustrative, and not a restrictive sense. Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed. The scope of the invention should be measured solely by reference to the claims that follow.

What is claimed is:

1. A method of controlling traffic on an on-chip network, the method comprising:
   injecting a packet at a first rate into the on-chip network by a first node coupled to the on-chip network;
   receiving the packet at a second node coupled to the on-chip network;
   determining that the received packet is to be deflected and not buffered by the second node;
   modifying a first bit in the received packet by the second node in response to determining that a rate at which packets are injected into the on-chip network should change and a second bit different than the first bit in the received packet to indicate that the received packet was deflected;
   returning the packet with the first and second bits modified to the first node by the second node; and
   changing the first rate by the first node in response to detecting that the first and second bits in the packet were modified.

2. The method of claim 1, wherein determining by the second node that a rate at which packets are injected into the on-chip network should change comprises determining that the first rate should be reduced.

3. The method of claim 2, wherein determining that the first rate should be reduced comprises determining that the second node lacks resources to handle the packet at the time the second node receives the packet.

4. The method of claim 2, wherein determining that the first rate should be reduced comprises determining that a number of packets deflected by the second node exceeds a threshold number.

5. The method of claim 1, wherein the second node is a destination node for the packet.

6. The method of claim 1, wherein the second node is an intermediate node to forward the packet to a destination node.

7. The method of claim 1, wherein returning the packet to the first node comprises transmitting the packet to the first node via a pre-defined route.

8. The method of claim 7, wherein the pre-defined route is a route the packet took from the first node to the second node.

9. The method of claim 1, wherein returning the packet to the first node comprises transmitting the packet to the first node via a random route.

10. The method of claim 1, wherein the on-chip network is a buffered network.

11. A non-transitory computer-readable storage medium having content stored thereon, which when executed causes one or more processors having nodes organized as an on-chip buffered network to:
- inject a packet at a first rate into the on-chip network by a first node coupled to the on-chip network;
- receive the packet at a second node coupled to the on-chip network;
- determine that the received packet is to be deflected and not buffered by the second node;
- modify a first bit in the received packet by the second node in response to determining that a rate at which packets are injected into the on-chip network should change and a second bit different than the first bit in the received packet to indicate that the received packet was deflected;
- return the packet with the first and second bits modified to the first node by the second node; and
- change the first rate by the first node in response to detecting that the first and second bits in the packet were modified.

* * * * *